(12) United States Patent
Omi

(10) Patent No.: US 8,797,430 B2
(45) Date of Patent: Aug. 5, 2014

(54) INFORMATION PROCESSING APPARATUS FOR DISPLAYING AN ANOMALOUS PIXEL

(75) Inventor: Hiroyuki Omi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 293 days.

(21) Appl. No.: 12/870,155

(22) Filed: Aug. 27, 2010

(65) Prior Publication Data

US 2011/0050933 A1   Mar. 3, 2011

(30) Foreign Application Priority Data

Aug. 28, 2009   (WO) .................. PCT/JP2009/065040

(51) Int. Cl.
*H04N 9/64* (2006.01)
*H04N 5/222* (2006.01)

(52) U.S. Cl.
USPC ..................................... 348/247; 348/333.04

(58) Field of Classification Search
USPC .............................. 348/246, 247, 333.02, 616
See application file for complete search history.

(56) References Cited

U.S. PATENT DOCUMENTS

| | | | |
|---|---|---|---|
| 6,529,618 B1 * | 3/2003 | Ohara et al. | 382/132 |
| 6,661,456 B1 * | 12/2003 | Aufrichtig et al. | 348/247 |
| 6,919,568 B2 * | 7/2005 | Odogba et al. | 250/370.09 |
| 2001/0031098 A1 * | 10/2001 | Ford | 382/275 |
| 2005/0030412 A1 * | 2/2005 | Nakayama | 348/362 |
| 2007/0195185 A1 * | 8/2007 | Onuki | 348/333.02 |
| 2008/0230708 A1 * | 9/2008 | Enomoto | 250/370.08 |
| 2008/0297628 A1 * | 12/2008 | Kimura | 348/246 |

\* cited by examiner

*Primary Examiner* — Albert Cutler

(74) *Attorney, Agent, or Firm* — Canon USA Inc. IP Division

(57) ABSTRACT

An information processing apparatus that causes display of anomalous pixels of images includes acquisition means for acquiring positions of anomalous pixels in a captured image using a plurality of acquisition schemes for acquiring anomalous pixels; and display control means for causing a display unit to display an image showing the positions of anomalous pixels obtained by the acquisition means so that the relative position between the anomalous pixels in the captured image is maintained and that the display format for each of the positions of anomalous pixels is changed in accordance with the acquisition schemes.

21 Claims, 11 Drawing Sheets

INFORMATION PROCESSING APPARATUS FOR DISPLAYING AN ANOMALOUS PIXEL

TECHNICAL FIELD

The present invention relates to an information processing apparatus, an information processing system, an information processing method for causing display of the positions of anomalous pixels that occur in images which have been captured by an image capturing apparatus, and a storage medium storing a computer program for performing the information processing method.

BACKGROUND ART

An image that has been captured by an image capturing apparatus is constituted by a plurality of pixels. The overall image is formed using color or density that the pixels represent. However, pixels called anomalous pixels exist among the plurality of pixels. Anomalous pixels are defective pixels having outputs that deviate from an output range which is determined for a predetermined input in advance because of abnormalities of circuits or elements included in the image capturing apparatus, or the like, or pixels having values indicating other abnormalities or failures. Because the anomalous pixels influence the image quality of the captured image, the anomalous pixels are corrected, for example, using a method for replacing the anomalous pixels using the average pixel values of pixels surrounding the anomalous pixels or the like. An image in which the anomalous pixels are corrected is provided for a user.

Furthermore, the positions of anomalous pixels change in accordance with anomalous-pixel acquisition schemes, such as image capture schemes for images and schemes for extracting anomalous pixels from the images. As a technology for correcting anomalous pixels, in Japanese Patent Laid-Open No. 2000-101925, a technology for correcting the positions of anomalous pixels that change in accordance with image capture schemes performed by an image capturing apparatus is disclosed. In Japanese Patent Laid-Open No. 2004-187163, a technology for extracting anomalous pixels that differ in accordance with the gain of a circuit system, and for correcting the anomalous pixels is disclosed.

On the other hand, for example, in medical fields, there is a demand for checking of positions at which anomalous pixels that were subjected to a correction process existed. The reason for this is that, because pixel values of the anomalous pixels have been changed by performing the correction process on the anomalous pixels, it is necessary to check the original image. In Japanese Patent Laid-Open No. 2001-8928, a technology for displaying the positions of anomalous pixels that exist in a region which a user selects in a fluoroscopic image is disclosed. However, in display of anomalous pixels that is disclosed in Japanese Patent Laid-Open No. 2001-8928, a fact that the positions of anomalous pixels change in accordance with anomalous-pixel acquisition schemes is not considered. In the technologies described in the above-mentioned Japanese Patent Laid-Open No. 2000-101925 and Japanese Patent Laid-Open No. 2004-187163, the differences among acquisition schemes are considered. However, the technologies described in the above-mentioned Japanese Patent Laid-Open No. 2001-8928 and Japanese Patent Laid-Open No. 2000-101925 are technologies that relate to correction processes for causing anomalous pixels to disappear, and technologies that conflict with display of anomalous pixels.

Thus, in the related art, in a case in which a plurality of anomalous-pixel acquisition schemes are utilized, such as a case in which a plurality of image capture schemes or a plurality of schemes for extracting anomalous pixels exist, there is no technology for meeting a demand for comparison and checking of the positions of anomalous pixels that change on an acquisition-scheme-by-acquisition-scheme basis.

SUMMARY OF INVENTION

According to the present invention, the foregoing object is attained by providing an information processing apparatus that causes display of anomalous pixels of images. The information processing apparatus includes acquisition means for acquiring positions of anomalous pixels in a captured image using a plurality of acquisition schemes for acquiring anomalous pixels; and display control means for causing a display unit to display an image showing the positions of anomalous pixels obtained by the acquisition means so that the relative position between the anomalous pixels in the captured image is maintained and that the display format for each of the positions of anomalous pixels is changed in accordance with the acquisition schemes.

According to the present invention, because anomalous pixels and acquisition schemes therefor can be displayed so that the anomalous pixels and the acquisition schemes are associated with other, how anomalous pixels appear in correspondence with the acquisition schemes that are utilized can be checked while being checked.

Further features of the present invention will become apparent from the following description of exemplary embodiments with reference to the attached drawings.

DESCRIPTION OF EMBODIMENTS

Hereinafter, embodiments of the present invention will be described as first to third embodiments. Note that, in the present invention, an anomalous pixel is an abnormal pixel or a pixel having an output failure, and is a pixel having a pixel value that significantly deviates from pixel values of pixels surrounding the pixel. For example, there is a method in which an image is divided into predetermined regions, and in which pixels having pixel values that deviate from the average pixel value of pixels in each of the divided regions by eight times or more of the standard deviation are defined as anomalous pixels. In the embodiments given below, among the anomalous pixels, defective pixels that occur owing to abnormalities of elements, circuits, or the like will be described as examples of the anomalous pixels.

First Embodiment

Figure 1:
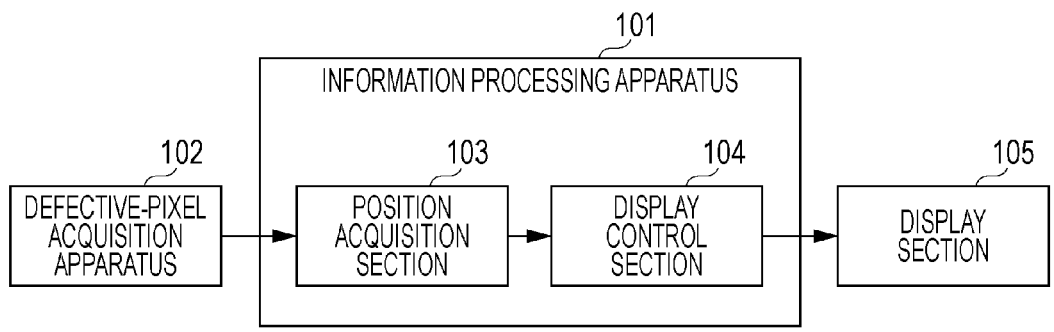
FIG. 1 is a diagram of a configuration of an information processing apparatus according to a first embodiment.
Figure 2:
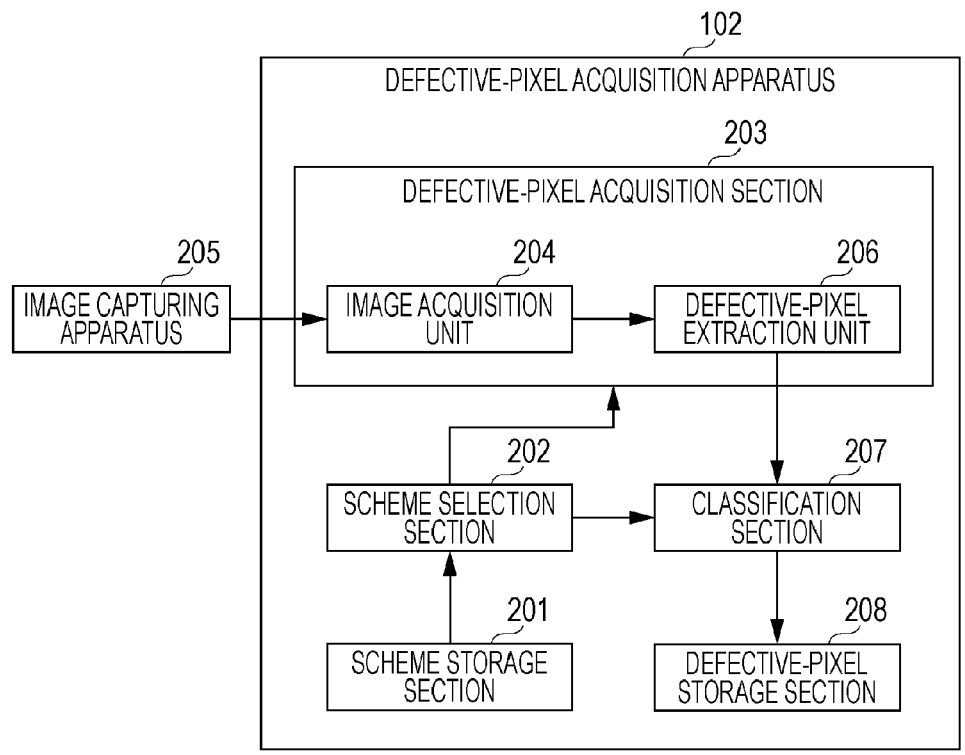
FIG. 2 is a diagram of a configuration of a defective-pixel acquisition apparatus that is utilized together with the information processing apparatus according to the first embodiment.
Figure 3:
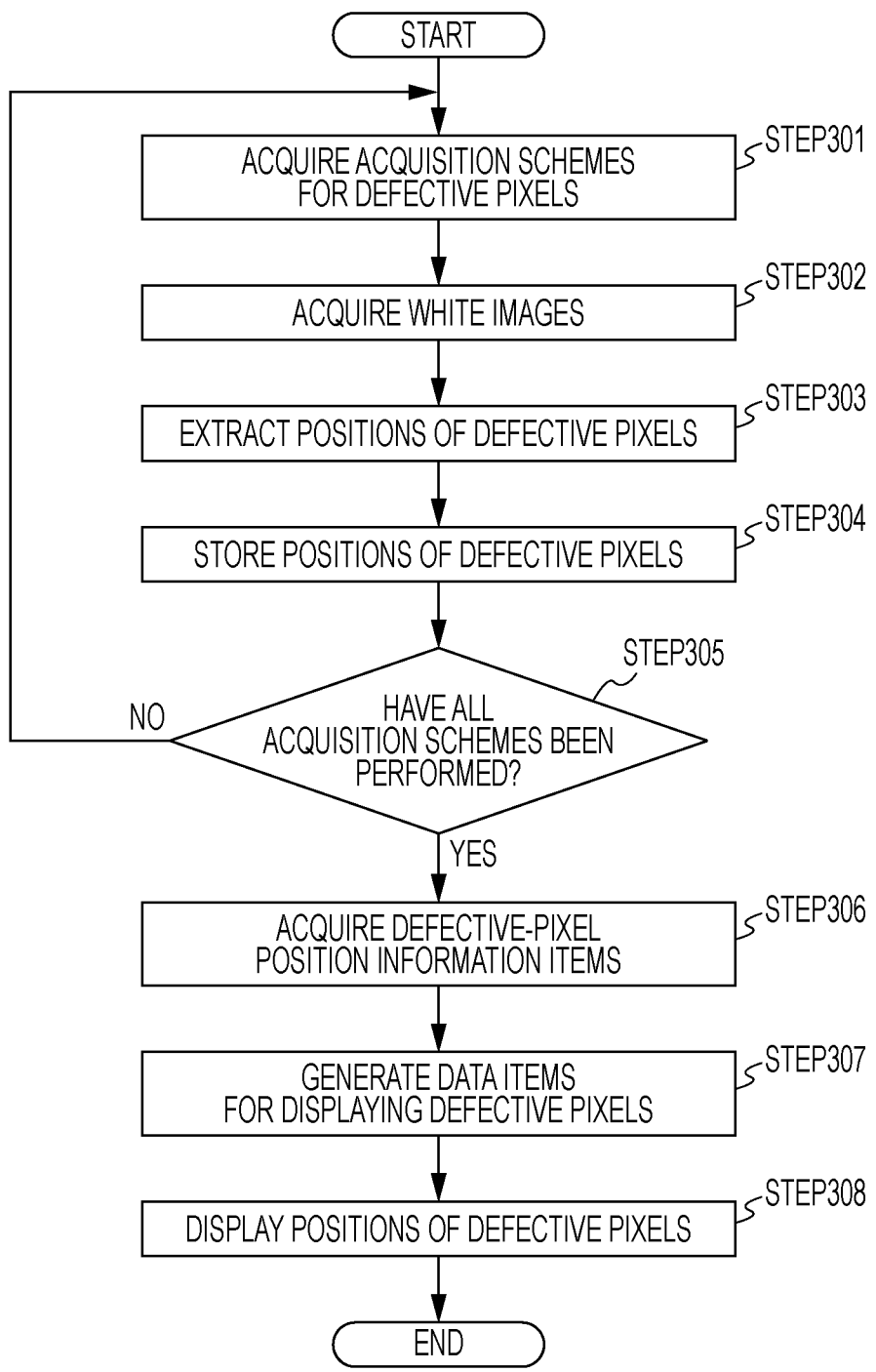
FIG. 3 is a flowchart illustrating a flow of a process performed by the information processing apparatus.

Hereinafter, the first embodiment will be described using FIGS. 1 to 4. The present embodiment is an embodiment in which the present invention is applied to an information processing apparatus that displays the positions of defective pixels which are acquired from images that have been captured by an image capturing apparatus. The information processing apparatus performs display control of causing display of the positions of defective pixels, which are acquired using each of a plurality of acquisition schemes for acquiring defective pixels, in display formats that differ on an acquisition-scheme-by-acquisition-scheme basis. Accordingly, the information processing apparatus is an apparatus that displays defective-pixel position information items concerning the positions of defective pixels and the acquisition schemes so that the defective-pixel position information items and the acquisition schemes are associated with each other. FIG. 1 is a diagram illustrating a configuration of an information processing apparatus according to the present invention. FIG. 2 is a diagram illustrating a configuration of a defective-pixel acquisition apparatus that acquires defective-pixel position information items. FIG. 3 is a flowchart illustrating a flow of a process that the defective-pixel acquisition apparatus and the information processing apparatus perform. FIG. 4 includes diagrams illustrating examples of screens that the information processing apparatus causes a display section to display.

Here, defective-pixel acquisition schemes in the present embodiment have a concept that both extraction schemes for extracting defective pixels from extraction targets and image capture schemes in a case in which the image capturing apparatus acquires images that are defective-pixel extraction targets are included.

The configuration of the information processing apparatus illustrated in FIG. 1 will be described. An information processing apparatus 101 is an apparatus that acquires defective-pixel position information items from a defective-pixel acquisition apparatus 102, and that performs display control of causing a display section 105 to display the defective-pixel position information items. A position acquisition section 103 of the information processing apparatus 101 acquires the positions of defective pixels that the defective-pixel acquisition apparatus 102 has acquired. The positions of defective pixels are positions of defective pixels that are obtained by performing each of a plurality of acquisition schemes. The position acquisition section 103 acquires the positions of defective pixels corresponding to a plurality of extraction schemes. A display control section 104 of the information processing apparatus 101 is a section that performs display control for causing display of the positions of defective pixels in images, and generates display data items for displaying defective-pixel position information items concerning the acquired positions of defective pixels in display formats that differ on an acquisition-scheme-by-acquisition-scheme basis. The display data items are transmitted to the display section 105, and the defective pixels and the acquisition schemes therefor are displayed so that the defective pixels and the acquisition schemes are associated with each other.

The configuration of the defective-pixel acquisition apparatus 102 that is illustrated in FIG. 2 and that acquires defective pixels will be described. The defective-pixel acquisition apparatus 102 is an apparatus that acquires images which have been captured by an image capturing apparatus 205 using a plurality of image capture schemes, that acquires defective pixels, and that classifies and stores the defective pixels on an acquisition-scheme-by-acquisition-scheme basis. In a scheme storage section 201, a plurality of defective-pixel acquisition schemes are stored. Data items that are stored as the acquisition schemes are data items regarding image capture schemes for image data items that are defective-pixel acquisition targets, data items regarding extraction schemes for extracting defective pixels from images, and so forth. Furthermore, for example, a plurality of acquisition schemes may be stored for the same moving image. A scheme selection section 202 acquires the plurality of acquisition schemes from the scheme storage section 201, selects the acquisition schemes on a one-by-one basis, and transmits the acquisition schemes to a defective-pixel acquisition section 203. Note that a configuration may be used, in which a defective-pixel acquisition scheme is acquired and performed in accordance with a user input as appropriate without using the scheme storage section 201.

An image acquisition unit 204 of the defective-pixel acquisition section 203 acquires images that are defective-pixel extraction targets from the image capturing apparatus 205 on the basis of information items concerning the selected acquisition schemes. A defective-pixel extraction unit 206 extracts defective pixels from the images. Here, as a defective-pixel extraction method, a method is used, in which, for example, using the example of definition of anomalous pixels, pixels having pixel values that deviate from the average pixel value of pixels in a predetermined region by eight times or more of the standard deviation is determined as defective pixels. Pixels that are extracted using this method can also include anomalous pixels other than the defective pixels. In this point, it is clear that the present embodiment can be applied not only to the defective pixels but also to anomalous pixels.

A classification section 207 classifies the defective pixels that have been extracted by the defective-pixel extraction unit 206. The classification section 207 stores the acquired positions of the defective pixels and the defective-pixel acquisition schemes, which have been selected by the scheme selection section 202, so that the positions of the defective pixels and the defective-pixel acquisition schemes are associated with each other. The display control section 104 generates display data items on the basis of the positions of the defective pixels, and causes the display section 105 to display the display data items, thereby performing display of the defective pixels. Screen displays of the defective pixels will be described below.

Note that the acquisition schemes are classified into image capture schemes for images and extraction schemes for extracting defective pixels from the images that are obtained using the image capture schemes. As the image capture schemes, there are still-image capture, moving-image capture, and so forth. Furthermore, there are a scheme for capturing a moving image by performing pixel addition and readout (binning) and a scheme for capturing a moving image without performing pixel addition and readout. Moreover, there are a scheme for capturing a moving image, in which the priority of frame rate is higher than that of image quality, and a scheme for capturing a moving image, in which the priority of image quality is higher than that of frame rate. As one of the extraction schemes, there is a method in which a plurality of images are acquired, and in which pixels that are determined as pixels having abnormal outputs in a predetermined number or more of images among the acquired images are considered as defective pixels. For example, four images are acquired, and pixels that are determined as pixels having abnormal outputs in two or more of the four images are considered as defective pixels. As a method for determining an abnormal output, there is a method in which an image is divided into a plurality of regions, in which the average value of pixel values is calculated for each of the regions, and in which pixels having values that deviate from a predetermined range including the average value are determined as defective pixels. For example, pixel values that deviate from the average value by eight times or more of the standard deviation are determined as abnormal outputs. Furthermore, determination of defective pixels that are extraction targets, such as isolated defective pixels, defective pixels that form a group, and line defects that have a linear continuous distribution, is also included in the defective-pixel acquisition schemes. Moreover, whether defective pixels are to be extracted from images that are captured images and that have not been subjected to correction called offset correction or gain correction, which are known, and whether defective pixels are to be extracted from images that have been subjected to image processing are also included in the acquisition schemes.

Images that are defective-pixel extraction targets may be images called white images, which are acquired by irradiating a sensor plane of the image capturing apparatus with substantially uniform light without a subject whose images are to be captured, or may be captured images of a predetermined test pattern.

The flow of the process that is illustrated in FIG. 3 and that is performed by the above-described apparatus will be described. The process is a process of acquiring defective-pixel position information items concerning the positions of defective pixels and acquisition schemes corresponding to the defective pixels from the apparatus that performs the plurality of defective-pixel acquisition schemes, and of displaying the defective pixels in display formats that differ on an acquisition-scheme-by-acquisition-scheme basis.

First, the scheme selection section 202 of the defective-pixel acquisition apparatus 102 acquires a plurality of defective-pixel acquisition schemes from the scheme storage section 201 (step 301). The defective-pixel acquisition section 203 sequentially performs the plurality of defective-pixel acquisition schemes that have been acquired. The image acquisition unit 204 of the defective-pixel acquisition section 203 acquires images from the image capturing apparatus 205 (step 302). In this case, the image acquisition unit 204 acquires images that are obtained using image capture schemes which are determined in the selected defective-pixel acquisition schemes.

The defective-pixel extraction unit 206 of the defective-pixel acquisition apparatus 102 extracts defective pixels from the white images that have been acquired (step 303). The classification section 207 acquires, from the extraction unit, the acquired positions of the defective pixels. The classification section 207 acquires the acquisition schemes from the scheme selection section 202, and causes the defective-pixel storage section 208 to store the positions of the defective pixels and the acquisition schemes so that the positions of the defective pixels and the acquisition schemes are associated with each other (step 304). After that, the scheme selection section 202 determines whether all of necessary acquisition schemes have been performed (step 305). The determination may be performed by the scheme selection section 202 in accordance a user input. If there is a defective-pixel acquisition scheme that is a target to be performed, the process proceeds to step 301, and acquisition of defective pixels is performed. If the acquisition has finished, a defective-pixel acquisition process is terminated. With the above process, defective pixels that are obtained using the plurality of defective-pixel acquisition schemes for the image capturing apparatus 205 are stored in the defective-pixel storage section 208 of the defective-pixel acquisition apparatus 102.

Next, the position acquisition section 103 of the information processing apparatus 101 according to the present invention acquires defective-pixel position information items concerning the positions of the defective pixels that are stored in step 304 (step 306). The position information items concerning the positions of the defective pixels are information items that are obtained by performing the plurality of defective-pixel acquisition schemes with the defective-pixel acquisition section 203 of the defective-pixel acquisition apparatus 102 in the above-described steps 302 and 303. In the position information items, information items concerning the acquisition schemes are included together with information items concerning the positions of the defective pixels. The display control section 104 of the information processing apparatus 101 generates display data items for displaying the defective pixels in display formats that are changed in accordance with the acquisition schemes (step 307), and the display section 105 performs display (step 308).

Figure 4A:
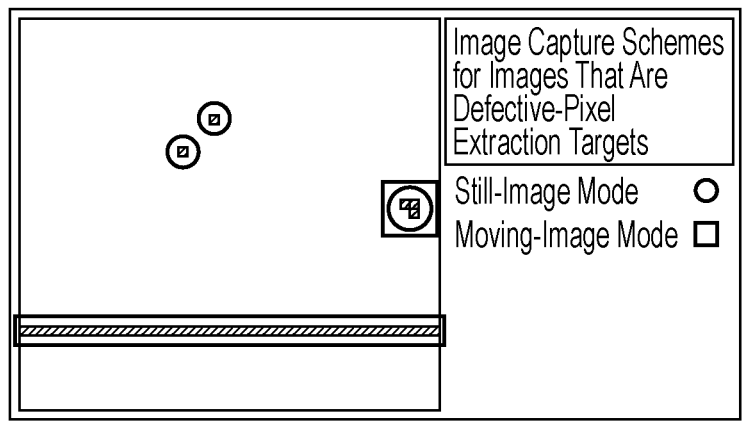
FIGS. 4A and 4B are diagrams illustrating examples of defective-pixel display screens that are displayed by the image processing apparatus.

In a display screen illustrated in FIG. 4A, filled square marks are attached at positions at which defective pixels exist, and symbols corresponding to the image capture schemes are attached. Accordingly, the positions of defective pixels that occur on an image-capture scheme-by-image-capture-scheme basis can be checked using the corresponding symbols. Note that a display format may be used, in which defective pixels are displayed with different colors. As described above, because the positions of defective pixels are displayed in display formats that differ on an acquisition-scheme-by-acquisition-scheme basis, the positions of defective pixels corresponding to the plurality of acquisition schemes can be simultaneously checked in one screen. Such an effect is an effect that could not have been conceived from the related art in which neither display of the positions of defective pixels that are acquired using a plurality of acquisition schemes nor display in display formats that differ on an acquisition-scheme-by-acquisition-scheme basis is disclosed.

Figure 4B:
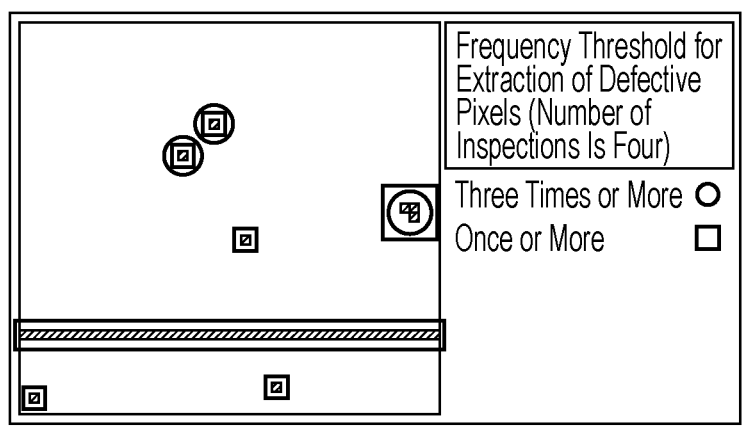

FIG. 4B illustrates another display example. Display corresponding to one acquisition scheme is performed on the right side in a screen. One scheme is a scheme in which a plurality of white images, e.g., four white images, are captured, and in which pixels that are determined as pixels having abnormal outputs in one or more of the four images are considered as defective pixels. Another scheme is a scheme in which pixels that are determined as pixels having abnormal outputs in three or more of the images are considered as defective pixels. Compared with the latter scheme, the former scheme is a scheme for extracting, as defective pixels, even pixels that are determined as slightly unstable pixels, and is used for a case in which correction using defective pixels is utilized. The scheme is utilized, for example, for a case in which the reliability of a defective-pixel correction process is high. Compared with the former scheme, the latter scheme is a scheme that is utilized for a purpose for limiting pixels which are to be extracted as defective pixels to particularly unstable pixels. For example, the scheme is a scheme that is utilized for a case in which, when pixels are more or less unstable, the image quality can be ensured using another correction such as gain correction. In this manner, when switching among the extraction schemes is performed as circumstances demand, the positions of defective pixels that differ on an extraction-scheme-by-extraction-scheme basis can be checked.

Second Embodiment

Figure 5:
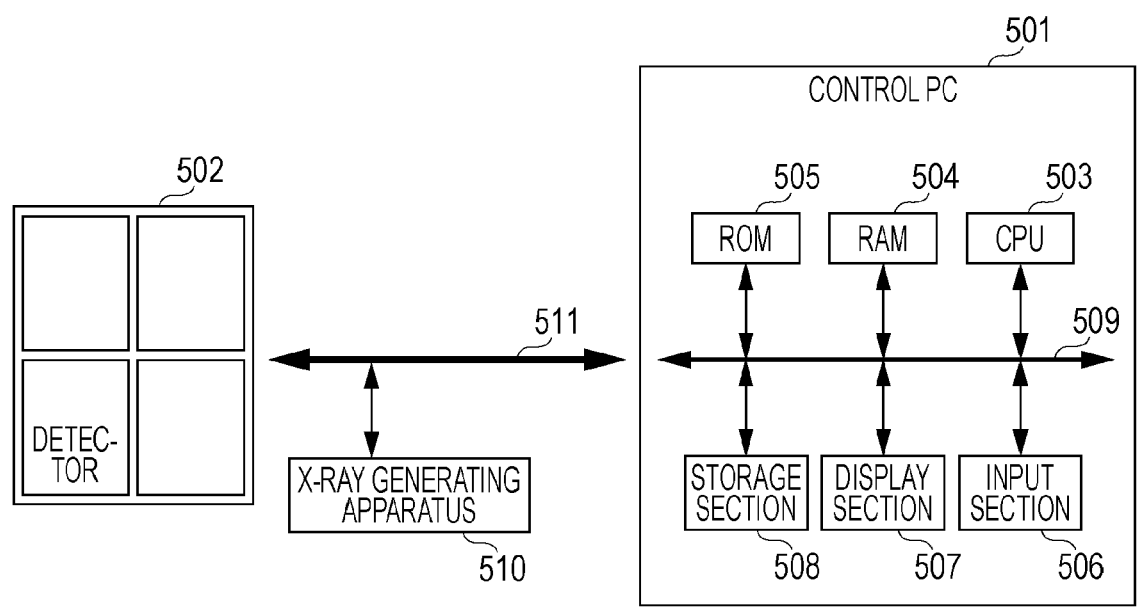
FIG. 5 is a diagram of a configuration of an X-ray imaging system according to a second embodiment.
Figure 6:
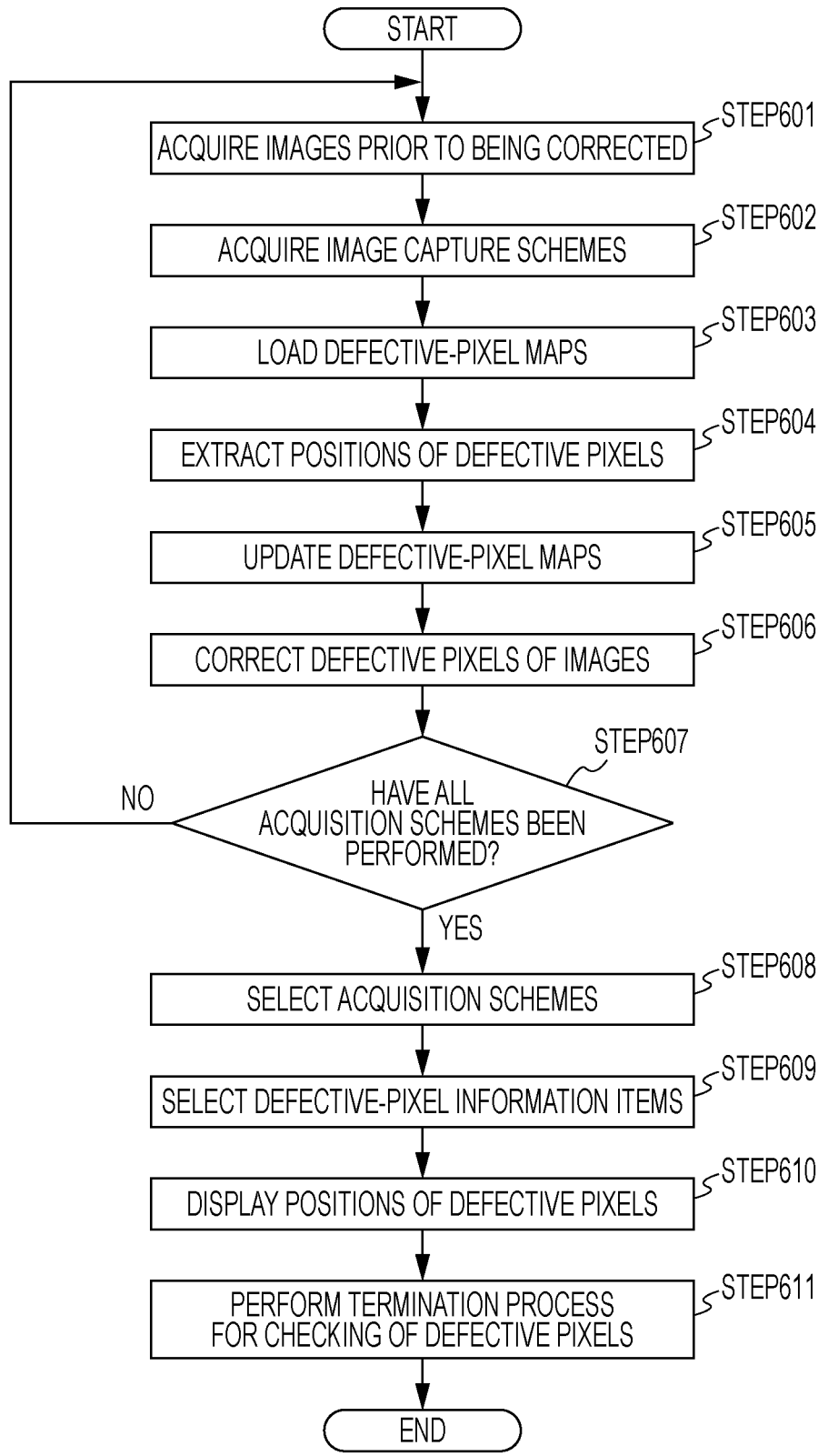
FIG. 6 is a flowchart illustrating a flow of a process of displaying defective pixels, which is performed by the X-ray imaging system.

The second embodiment will be described using FIGS. 5 to 10. In the present embodiment, an X-ray imaging system captures images, and extracts and acquires defective-pixel position information items concerning the positions of defective pixels from the images. Then, the X-ray imaging system selects at least one defective-pixel acquisition scheme in accordance with a user input that specifies at least one acquisition scheme among the acquisition schemes, and performs display of the positions of defective pixels corresponding to the at least one defective-pixel acquisition scheme which has been selected. Thus, the X-ray imaging system is a system that displays the defective-pixel position information items and the acquisition schemes so that the defective-pixel position information items and the acquisition schemes are associated with each other. FIG. 5 is a diagram illustrating a configuration of an X-ray imaging system that is an information processing system according to the present invention. FIG. 6 is a flowchart illustrating a flow of a process that is performed by the information processing system. FIGS. 7 to 10 are diagrams illustrating examples of defective-pixel display screens that are displayed by the information processing system.

Hereinafter, the configuration of the X-ray imaging system illustrated in FIG. 7 will be described. An X-ray generating apparatus 510 irradiates X rays, which are generated, onto a subject whose image is to be captured, and a detector 502 receives the X-rays in synchronization with the irradiation. The detector 502 functions as an image-capturing section that converts the received X-rays into charge, that accumulates the charge, that reads out the charge as electric signals after a predetermined accumulation time has elapsed, and that performs predetermined image processing to form a subject image. In a control PC 501, a CPU 503, an RAM 504, an ROM 505, an input section 506, a display section 507, and a storage section 508 are connected to a bus 509. Furthermore, the control PC 501 is connected to the detector 502 via an optical fiber 511 that is a signal line. The control PC 501 acquires a subject image from the detector 502, and stores the subject image in the storage section 508. In addition, the control PC 501 performs a process of displaying the subject image on the display section 507. The input section 506 is configured using a mouse, a keyboard, and so forth to accept a user instruction. The display section 507 is configured, for example, using a liquid crystal display, and displays a display data item, which has been generated, in accordance with control performed by the CPU 503 functioning as a display control section.

In the control PC 501, a computer program for performing the process that is illustrated in FIG. 6 described below is stored in the storage section 508. The computer program is read into the RAM 504, and executed by the CPU 503. Accordingly, the defective-pixel display process, which is illustrated in FIG. 6, is realized by collaboration between hardware resources and the computer program of the control PC 501. In this case, the CPU 503 functions as a display control section of the display section 507.

The flow of the process that is illustrated in FIG. 6 and that is performed by the above-described X-ray imaging system will be described. As long as there is no specific definition, the CPU 503 serves as each of a subject that performs a process and a subject that provides an instruction for performing a process.

First, the detector 502 receives X rays that have passed through a subject whose image is to be captured, and captures a plurality of images prior to being corrected while switching among a plurality of image capture schemes is being performed (step 601). Furthermore, simultaneously with acquisition of the images prior to being corrected, the plurality of image capture schemes that have been performed by the detector 502 and the X-ray generating apparatus 510 are acquired (step 602). A notification of information items concerning the image capture schemes may be automatically provided from a sensor, thereby acquiring the information items, or a user may manually provide the information items. Next, defective-pixel maps that are data items including existing defective-pixel position information items are acquired from the storage section 508 (step 603). A defective-pixel map is a data item in a bitmap format, for example, in which a pixel that is a defective pixel is denoted by one and a pixel that is a normal pixel is denoted by zero. In this case, when acquisition is performed, defective-pixel maps that are classified in accordance with the image capture schemes which have been obtained in step 602 are acquired. Next, extraction of defects from the images prior to being corrected, which have been acquired in step 601, is performed (step 604). The CPU 503 that performs this step and that is provided in the control PC 501 corresponds to the position acquisition section 103 for defective pixels in the first embodiment.

Next, when the number of defective pixels has been increased in a detection result obtained in step 604, together with acquisition dates and times, new defective pixels are classified into the defective-pixel maps and added to the defective-pixel maps, and the defective-pixel maps are updated (step 605). The updated defective-pixel maps are stored in the storage section 508. For example, when a defective-pixel map includes a plurality of defective-pixel maps that are classified in accordance with the defective-pixel acquisition schemes, a task of updating the maps is performed, whereby defects are classified. In contrast, when one defective-pixel map that is not classified in accordance with the acquisition schemes is provided, information items concerning the defective-pixel acquisition schemes are caused to be included in values of the defective-pixel map, and the defective-pixel map is updated, whereby defective pixels are classified.

After that, the positions of defective pixels are determined using the updated defective-pixel maps, and defective-pixel correction is performed on the images prior to being corrected to acquire corrected images (step 606). Then, whether or not all of defective-pixel acquisition schemes have been performed is determined (step 607). If all of defective-pixel acquisition schemes have already been performed, the CPU 503 proceeds to a process of step 608. When there is a scheme that has not been performed yet, the CPU 503 proceeds to the process of step 601, and extraction of defective pixels from images prior to being corrected is performed. Here, all of defective-pixel acquisition schemes may be all of defective-pixel acquisition schemes that the image capturing system can perform, or may be all of defective-pixel acquisition schemes that the user has specified.

Next, alternatives of the defective-pixel acquisition schemes are displayed on the display section 507. The user operates the input section 506 to make a specification of the alternatives, and the CPU 503 selects, in accordance with an information item concerning the specification, the acquisition schemes for defect information items that should be displayed (step 608). When the defective-pixel acquisition schemes are selected, the defective-pixel maps corresponding to the schemes are selected, and generation of display data items for displaying the positions of defective pixels is performed on the basis of the maps (step 609). The display section 507 displays the image data items. Furthermore, on a screen, a display in which the user has made the specification on the screen is changed into a display indicating a selected state. Accordingly, the screen displays in which defective-pixel position information items concerning the positions of defective pixels are displayed and which are illustrated in FIGS. 7 to 10 are realized (step 610). Accordingly, the user can arbitrarily switch, in accordance with a specification of the acquisition schemes, the positions of defective pixels that are to be displayed, and can check the necessary positions of defective pixels as occasion requires. When a task of checking defects is completed, the user presses a check button, and the CPU 503 performs a termination process in accordance with this input (step 611). In the termination process, whether all of the acquisition schemes that are displayed on the screen has been selected by the user to display defects is determined by the CPU 503. Only after it is determined that all of the acquisition schemes have been selected, pressing of the check button is enabled. If it is determined that all of the acquisition schemes have not been selected, a notification saying so is provided. The color of the check button is changed depending on whether pressing of the check button is enabled or disabled, thereby notifying the user that checking of all of defective pixels has finished. Accordingly, a case in which some defective pixels are not checked can be prevented.

Figure 7A:
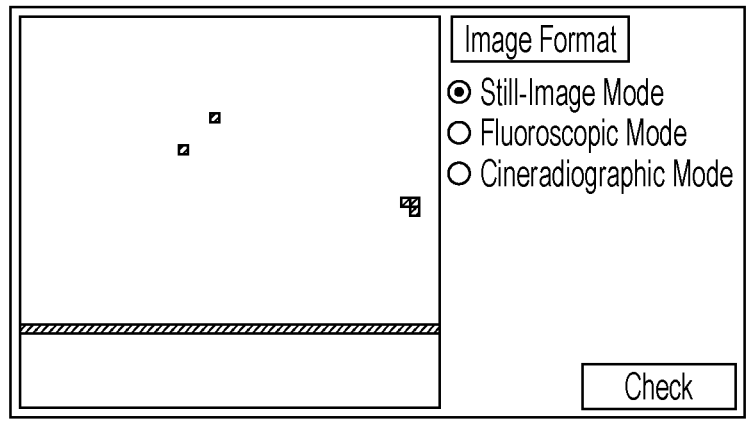
FIGS. 7A to 7C are diagrams illustrating examples of defective-pixel display screens that are displayed by the X-ray imaging apparatus.
Figure 7B:
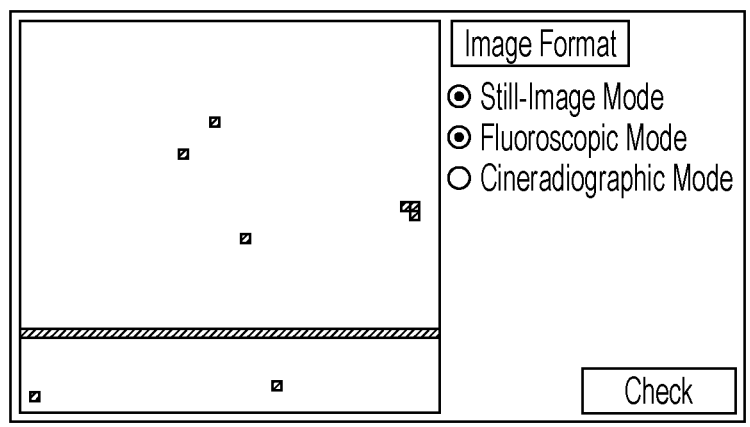
Figure 7C:
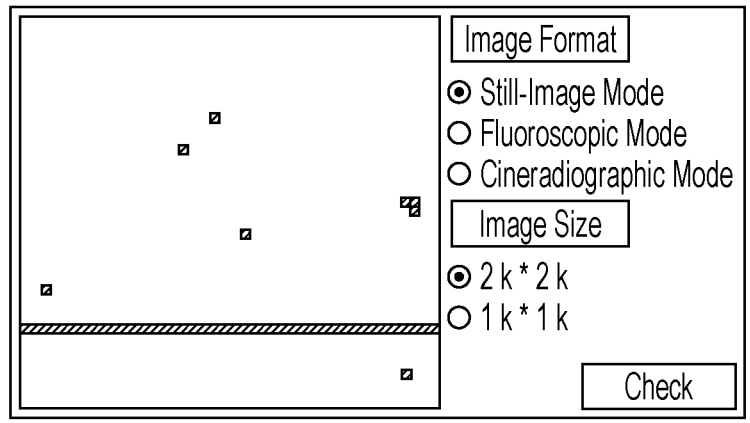

Screen displays that are illustrated in FIG. 7 as examples will be described. On the right side in FIG. 7A, image capture methods for images, such as still-image capture, cineradiography (moving-image capture with a large amount of X-rays), fluoroscopic imaging (moving-image capture), and numbers to be added in a case in which pixels are added to one another and read out, are displayed as formats for images. The user specifies defective-pixel acquisition schemes such as the image capture schemes, thereby selecting defective-pixel position information items concerning the positions of defective pixels corresponding to the defective-pixel acquisition schemes and displaying the defective-pixel position information items on the left side in the drawing. Accordingly, the positions of defective pixels that differ on an image-capture-scheme-by-image-capture-scheme basis can be checked. As illustrated in FIG. 7B, when a plurality of acquisition schemes are selected, a defect information item that is obtained as a result of logical OR using the selected schemes is acquired and displayed. In this case, if defect information items are displayed in display formats that differ on an acquisition-scheme-by-acquisition-scheme basis, the positions of defective pixels that appear on an acquisition-scheme-by-acquisition-scheme basis can be grasped. Furthermore, the image capture schemes can be displayed as they are. Note that the corrected images and the positions of defective pixels may be simultaneously displayed.

Figure 8A:
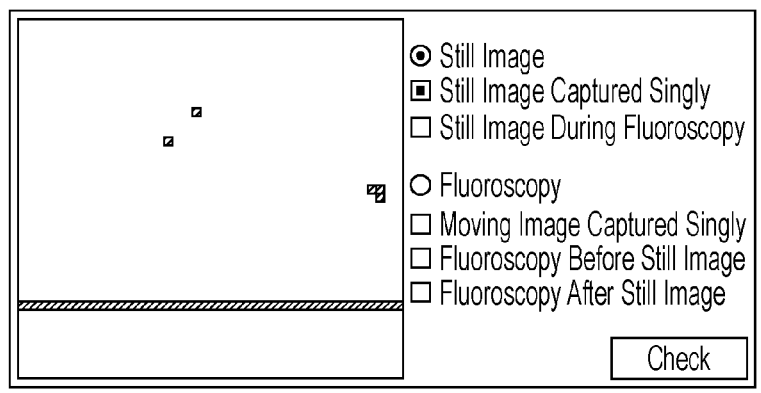
FIGS. 8A to 8D are diagrams illustrating examples of other display screens.

In a screen display illustrated in FIG. 8A, even regarding driving for a still image, selection can be made in accordance with image capture schemes that are performed before or after the driving. For example, there is a case in which driving of the image capturing apparatus in a case of still-image capture during moving-image capture is different from driving of the image capturing apparatus in a case of still-image capture that is singly performed. In this case, because the positions of defective pixels that occur in a case of still-image capture during moving-image capture are different from the positions of defective pixels that occur in a case of still-image capture that is singly performed, it is necessary to separately check the positions of defective pixels that occur in the still-image capture during moving-image capture and the positions of defective pixels that occur in the still-image capture that is singly performed. Such displays can be realized, when acquisition of defective pixels is performed, through separate acquisition of a still image that is captured in a typical manner and a still image that is captured during moving-image capture, and through extraction of defective pixels from the individual still images. Accordingly, even in a case in which defective pixels that appear in a still image that is singly captured and defective pixels that appear in a still image that is captured during moving-image capture are different from each other, the defective pixels that occur in the individual still images can be separately checked.

Figure 8B:
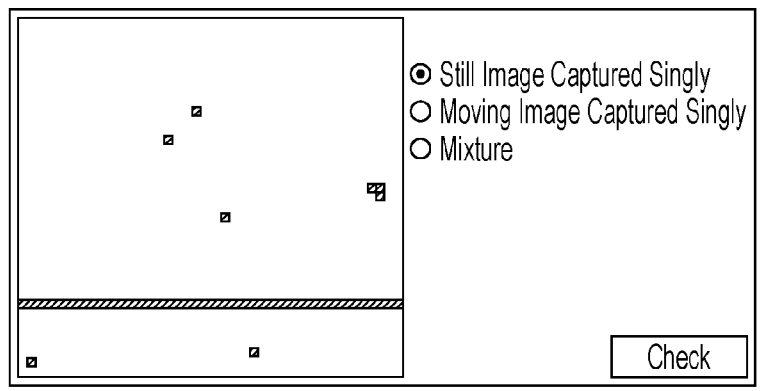
Figure 8C:
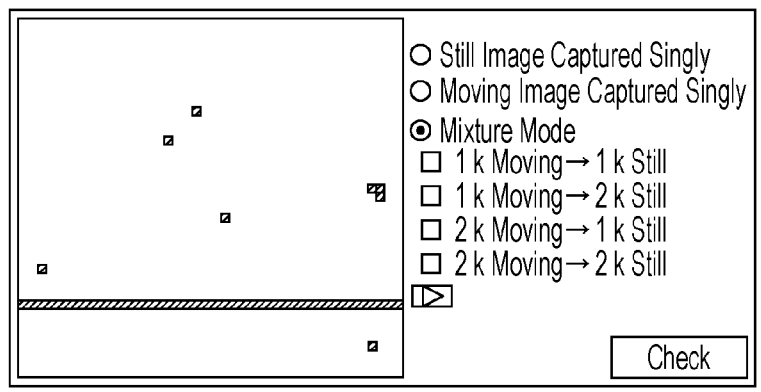
Figure 8D:
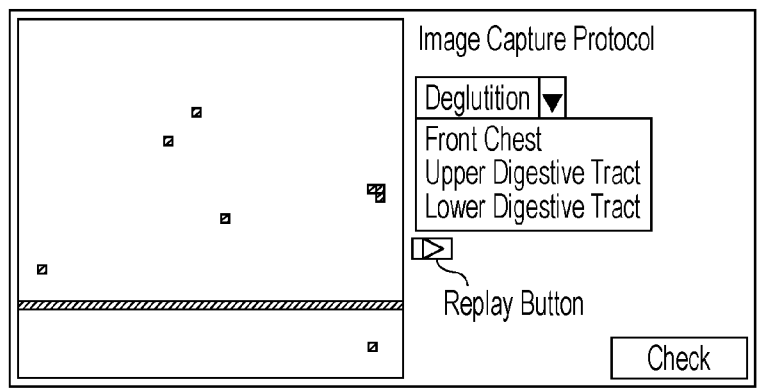

In FIG. 8C, a mixture mode in which still-image capture and moving-image capture are performed in combination can be selected separately from a mode for capturing a still image singly and a mode for capturing a moving image singly. In this case, in the mixture mode, further, whether or not addition and readout is performed for each of a moving image and a still image is selected. A defect information item is displayed in accordance with the configuration of addition and readout. In the mixture mode, a defect map of a moving image and a defect map of a still image are sequentially displayed. In the example of a screen display illustrated in FIG. 8C, image capture protocols are displayed as alternatives. Here, the image capture protocols are, for example, capture of an image of an upper digestive tract and capture of an image of a front chest. Image capture is performed using a combination of the plurality of image capture schemes such as moving-image capture and still-image capture. When an image capture protocol is determined, a series of image capture schemes that is performed by the detector and defective-pixel acquisition schemes including the image capture schemes are determined. The positions of defective pixels are displayed on the screen on the basis of the positions of defective pixels that can be obtained from a defective-pixel map and that are included in an image. Furthermore, a replay button is displayed on the screen. The replay button is pressed, thereby sequentially displaying the positions of defective pixels so that transition of defects at the time of image capture can be understood.

Figure 9:
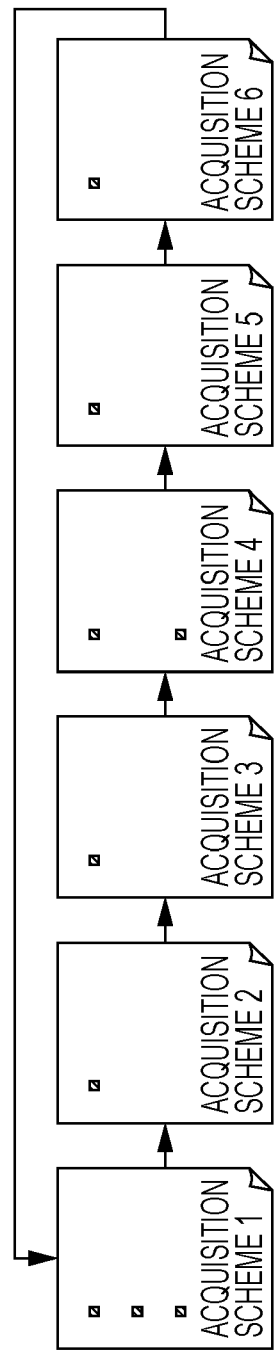
FIG. 9 is a diagram illustrating an example of a display screen in which images showing the positions of a plurality of defective pixels are sequentially displayed.

FIG. 9 is a diagram illustrating sequential display in a case in which the replay button illustrated in FIGS. 8B and 8C is pressed. In the example, there are five defective-pixel maps that are used for moving-image capture in a case in which still-image capture is performed using moving-image capture, and there is one defective-pixel map that is used for still-image capture in a case in which still-image capture is performed using moving-image capture. The defective-pixel maps are sequentially displayed so that transition of defects can be understood. Alternatively, when there is only one defective-pixel map that is used for moving-image capture, a display time over which the defective-pixel map used for moving-image capture is displayed may be increased so that the display time is longer than a display time over which the defective-pixel map used for still-image capture is displayed. With such a screen display, the positions of defective pixels that occur on an image-capture-scheme-by-image-capture-scheme basis can be checked in an order that is the same as an order in which the image capture schemes are utilized.

Figure 10A:
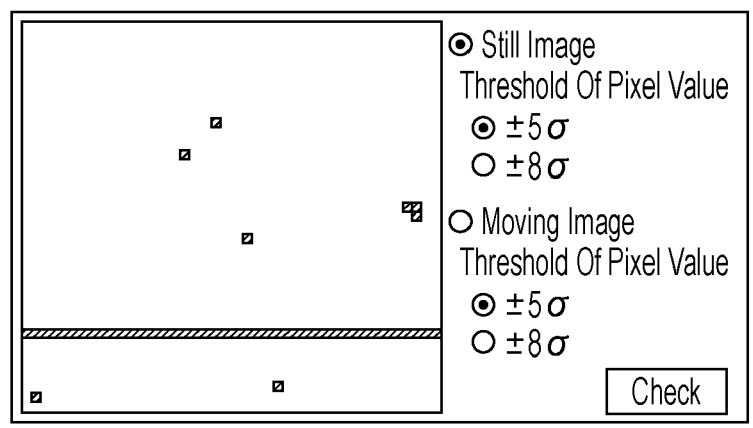
FIGS. 10A and 10B are diagrams illustrating examples of other defective-pixel display screens.

In FIG. 10A, extraction schemes in which, individually for defective pixels of a still image and for defective pixels of a moving image, an average pixel value m and a standard deviation value σ in predetermined small regions are calculated, and in which pixels whose pixel values fall outside a range of m±5σ are determined as defective pixels are displayed as alternatives. Furthermore, an extraction scheme in which pixels whose pixel values fall outside a range of m±8σ are determined as defective pixels can also be selected. Either of the extraction schemes is selected in accordance with a user input, and defective pixels are displayed in accordance with the selection. For example, typically, noise in a moving image is higher than noise in a still image. It can be considered that, in a moving image, pixels whose pixel values fall outside the range of m±8σ are processed as defective pixels and the other pixels are handled by a correction process such as gain correction. In this point of view, because noise is low in a still image, it can be considered that pixels whose pixel values fall outside the range of m±5σ are specified as defective pixels. In another point of view, the amount of X-rays in a moving image is smaller, and a process of increasing a gain for the moving image is performed so that the gain for the moving image is larger than that for the still image. Thus, when extraction of defective pixels from an image prior to being subjected to gain control is performed, a case can be considered, in which it is necessary to extract pixels whose pixel values exceed m±5σ as defects. Accordingly, because it is necessary to switch among the extraction schemes as circumstances demand, checking of defective pixels on an extraction-scheme-by-extraction-scheme basis is significant.

Figure 10B:
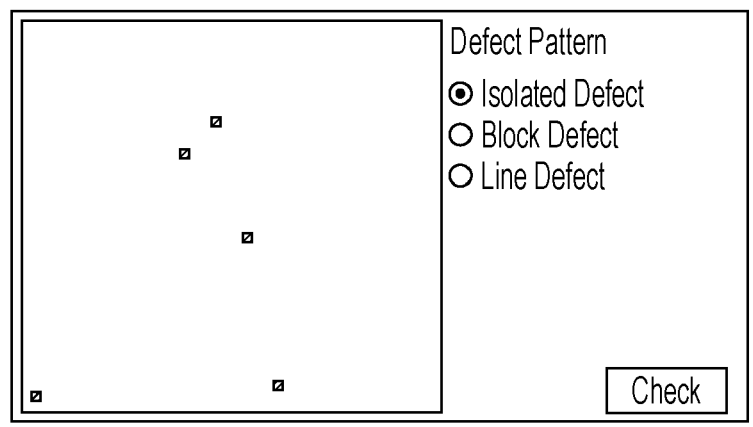

In FIG. 10B, extraction schemes for individually extracting isolated defects, block defects, and line defects are selected in accordance with user inputs, and defective pixels corresponding to the extraction schemes are displayed. For example, because the degree of influence of block defects, line defects, and so forth to image quality is large, selection of block defects, line defects, and so forth is significant for a case in which block defects, line defects, and so forth are preferentially checked. Furthermore, there is a probability that isolated defects change into block defects with aging. In this point, it is necessary to selectively check isolated defects.

Third Embodiment

Figure 11:
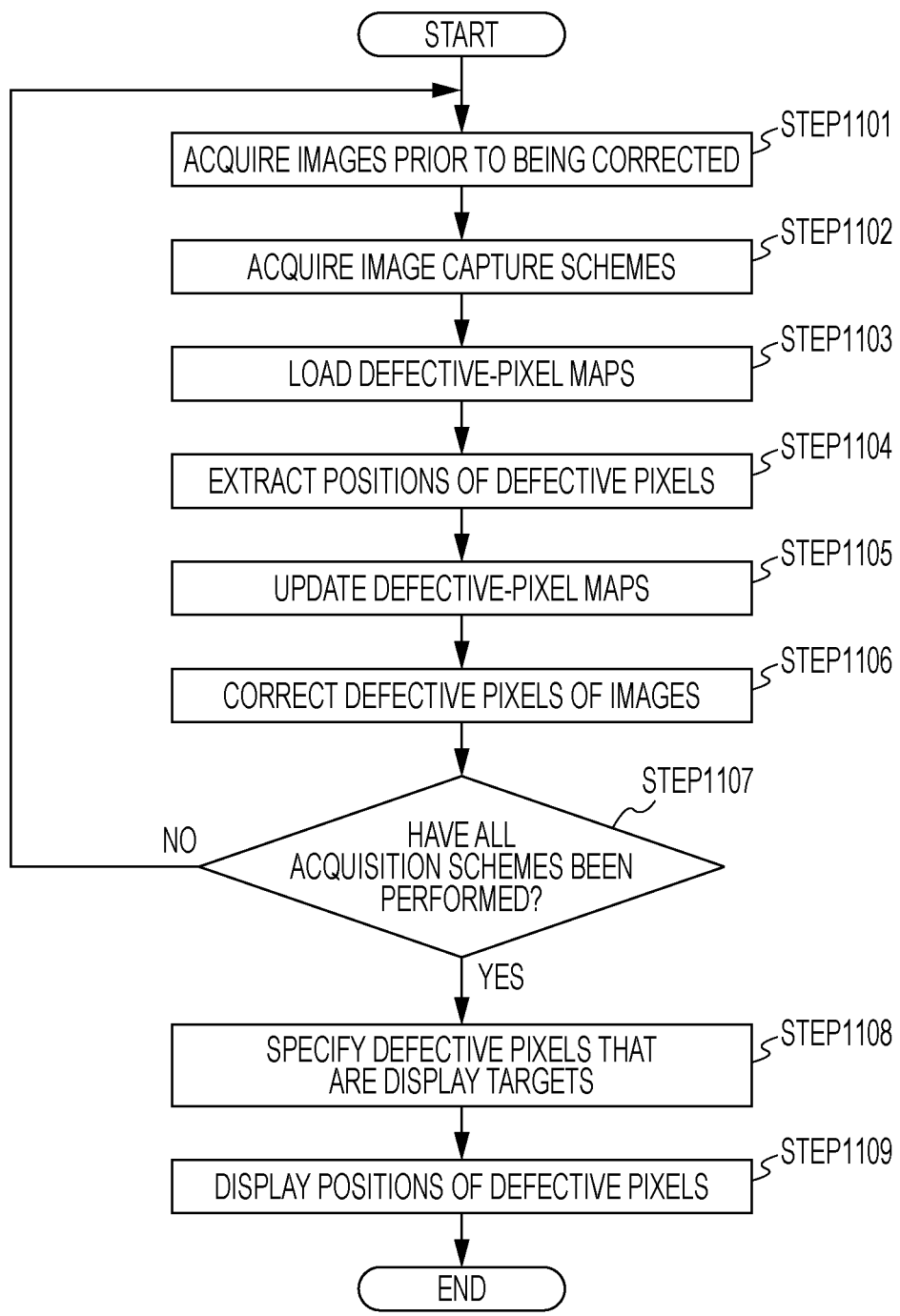
FIG. 11 is a flowchart illustrating a flow of a defective-pixel display process that an X-ray imaging system according to a third embodiment performs.

A third embodiment will be described with reference to FIGS. 11 and 12. The present embodiment is an embodiment in which images showing the positions of defective pixels are displayed so that the images are arranged on an acquisition-scheme-by-acquisition-scheme basis, thereby displaying defective-pixel position information items concerning the positions of defective pixels and acquisition schemes so that the defective-pixel position information items and the acquisition schemes are associated with each other. Furthermore, defective pixels that are specified from among acquired defective pixels and that, for example, will become serious problems in diagnosis are selected and displayed. FIG. 11 is a flowchart illustrating a flow of a process that an information processing system performs. FIG. 12 includes diagrams of examples of defective-pixel display screens that are displayed by the system. Note that, because the process and the display screens are realized by the information processing system having a configuration that is similar to the configuration in the second embodiment, a description of the configuration is omitted. In the flow of the process illustrated in FIG. 11, because steps other than step 1108 are similar to the steps in the second embodiment, a description thereof is omitted.

The process that an X-ray imaging system or the information processing apparatus performs will be described. A process of step 1108 illustrated in FIG. 11 is a process of specifying defective pixels that are display targets from among acquired defectives pixels. Hereinafter, a description will be made on the basis of the examples of screens illustrated in FIG. 12.

Figure 12A:
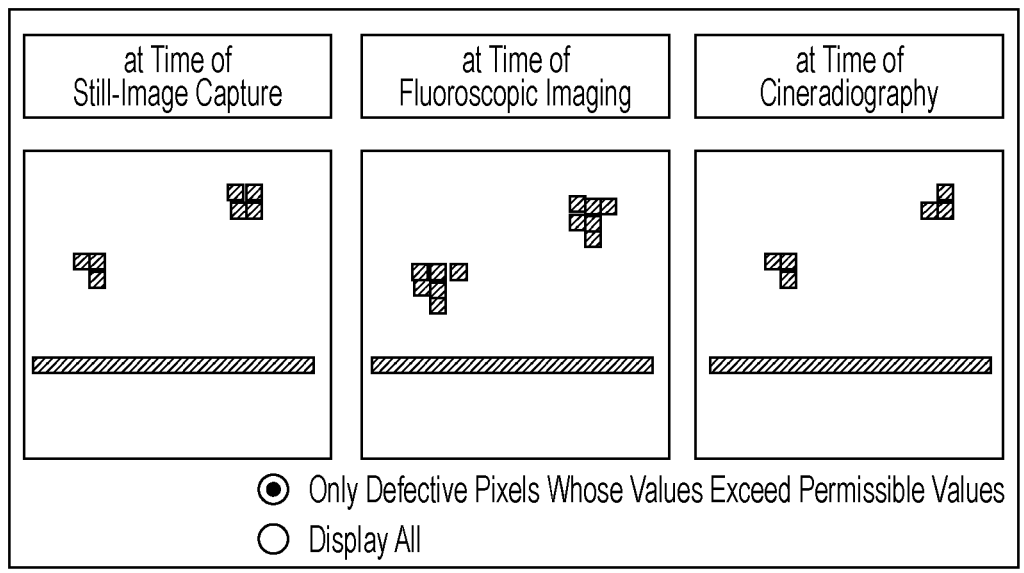
FIGS. 12A and 12B are diagrams illustrating screens in which the positions of defective pixels are displayed.

In the examples of screens which are illustrated in FIG. 12 and in which defective pixels are displayed, defective pixels corresponding to the plurality of acquisition schemes are displayed side by side. The defective pixels that appear at positions that differ on an acquisition-scheme-by-acquisition-scheme basis can be compared and checked. Furthermore, in the screen display illustrated in FIG. 12A, the positions of defective pixels corresponding to the image capture schemes, such as still-image capture, fluoroscopic imaging, and cineradiography, are displayed side by side. Accordingly, the positions of defective pixels can be checked on an acquisition-scheme-by-acquisition-scheme basis. Moreover, in FIG. 12A, the user selects a button in the screen, whereby display of all of the defective pixels or display of only the defective pixels whose values exceed permissible values regarding a size, a shape, a density, and so forth of defective pixels can be selected. Here, the permissible values are, in a case in which a plurality of defects that gather and cluster together constitute a group defect, permissible values of a shape that is formed by the group defect constituted by defective pixels which gather, an area that is occupied by the group defect constituted by defective pixels which gather in an image, and a defective-pixel density in a certain region of the image. For example, the area of a group defect constituted by a large number of defective pixels is large, and the degree of influence of the group defect to image quality is large. Furthermore, even regarding group defects constituted by the same number of defective pixels, the degree of influence of defective pixels having a circular distribution to image quality is larger than the degree of influence of defective pixels having a linear continuous distribution to image quality. Thus, the shape becomes a problem. Moreover, also when defective pixels are distributed with a high density in a fixed image region, it can be considered that the degree of influence of the defective pixels to image quality is large. The thresholds regarding the area, shape, density, and so forth are determined, determination of acquired groups of defective pixels using the thresholds is performed, and the groups of defective pixels are classified, thereby realizing a process. In this manner, defective pixels whose values exceed the permissible values regarding the size, shape, density, and so forth of defective pixels are displayed, whereby the positions of the defective pixels that particularly significantly influence image quality can be preferentially checked. Note that only defective pixels whose values exceed the permissible values may be displayed, or defective pixels whose values exceed the permissible values and defective pixels whose values do not exceed the permissible values may be displayed in different display formats.

Figure 12B:
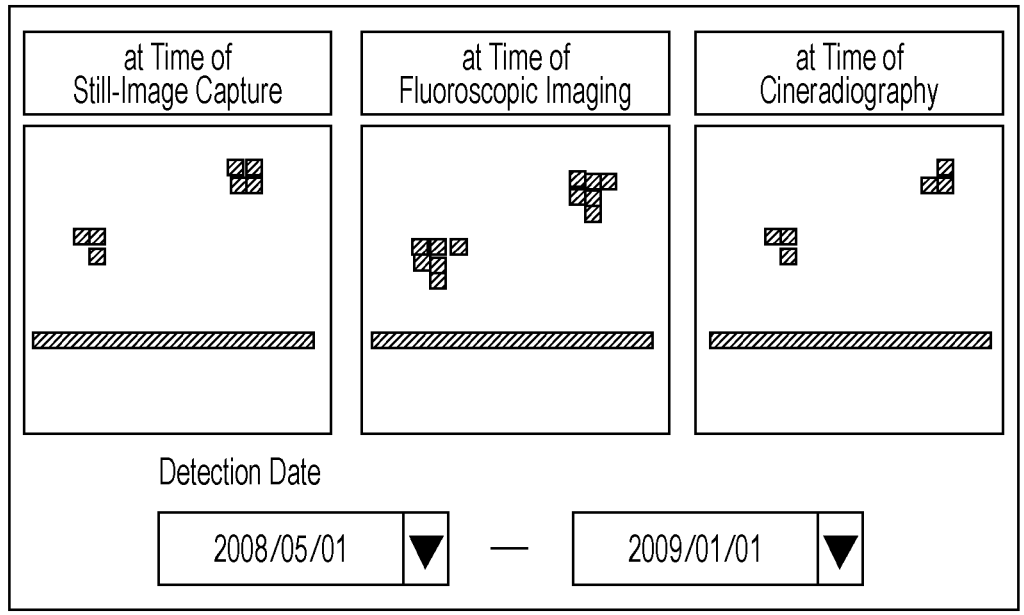

In FIG. 12B, a display screen is illustrated, in which, when the user specifies a detection date, defective pixels corresponding to the detection date are displayed. Because the number of defective pixels is increased over time because of deterioration due to aging of the apparatus, checking of defective pixels on a day-by-day basis is significant. For checking of defective pixels on a day-by-day basis, it is only necessary to perform defect correction on an existing defective-pixel map before detection of defective pixels is performed, to extract defective pixels using the corrected image as an input, and to update the defective-pixel map so that the defective pixels and an extraction date are associated with each other. Accordingly, for example, when checking of the positions of defective pixels of an image that was captured in the past is performed, a defective-pixel acquisition scheme corresponding to the image and a date on which the image was captured are specified, and the positions of defective pixels that appeared at the time of image capture can be checked.

As described above, defective pixels are described as examples of the anomalous pixels, and application examples for the defective pixels are described. However, application examples of the present invention are not limited thereto. Anomalous pixels other than the defective pixels may be targeted.

Note that, in the first embodiment, a configuration is used, in which the defective-pixel acquisition apparatus 102 that is provided outside the information processing apparatus 101 acquires the positions of defective pixels from images, and in which the position acquisition section 103 of the information processing apparatus 101 performs acquisition of the positions of defective pixels from the defective-pixel acquisition apparatus 102. However, the configuration is not limited thereto. The information processing apparatus 101 may extract and acquire the positions of defective pixels from images. In this case, the information processing apparatus 101 includes the defective-pixel acquisition section 203 that is provided in the defective-pixel acquisition apparatus 102, and the information processing apparatus 101 performs the entire process illustrated in FIG. 3, thereby realizing extraction and acquisition of the positions of defective pixels from images with the information processing apparatus 101.

In the above-described embodiments, when display of defective pixels is performed, a case has been described, in which, images showing the positions of the defective pixels are displayed. However, display of defective pixels is not limited to the case. For example, when the number of defective pixels that are acquired on an acquisition-scheme-by-acquisition-scheme basis becomes a problem, the number of defective pixels may be displayed. Furthermore, the coordinates of defective pixels in images may be displayed as character information items.

Moreover, the present invention can also be realized by performing a process given below. In other words, the process is a process of supplying a program that realizes the functions of the above-described embodiments to an information processing apparatus or an information processing system, and of reading and executing the program with a computer (alternatively, CPU, MPU, or the like) of the system or the apparatus.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Application No. PCT/JP2009/065040, filed Aug. 28, 2009, which is hereby incorporated by reference herein in its entirety.

The invention claimed is:

1. An information processing apparatus comprising:
    a position acquisition unit configured to acquire positions of anomalous pixels to be corrected in radiation images corresponding to a plurality of image capture methods, each image capture method including an imaging condition for radiation imaging of a subject to be imaged and each image capture method corresponding to one predetermined acquisition scheme of an anomalous pixel; and
    a display control unit configured to cause a display unit to display an image showing the positions of the anomalous pixels obtained by the position acquisition unit,
    wherein the display control unit is configured to cause the display unit to display, at least one of the positions of the anomalous pixels corresponding to an image capture method and at least one of the positions of the anomalous pixels corresponding to multiple image capture methods, differently.

2. The information processing apparatus according to claim 1,
    wherein the display control unit is configured to perform display so that a display format for each of the positions of the anomalous pixels which appear in all of the plurality of image capture methods is different from the display format for the anomalous pixels which appear only for a corresponding one of the plurality of image capture methods.

3. The information processing apparatus according to claim 1,
    wherein the display control unit is configured to cause display so that marks which differ on a method-by-method basis are attached to displayed positions of the anomalous pixels.

4. The information processing apparatus according to claim 1,
    wherein the display control unit is configured to cause the display unit to display, at least one of the anomalous pixels corresponding to only one image capture method and at least one of the anomalous pixels corresponding to multiple image capture methods, differently.

5. The information processing apparatus according to claim 4,
    wherein the plurality of image capture methods includes a method for capturing a moving image and a method for capturing a still image.

6. The information processing apparatus according to claim 1,
    wherein an extraction scheme for extracting anomalous pixels from an image corresponding to an image capture method is different from an extraction scheme for extracting anomalous pixels from an image corresponding to another image capture method.

7. The information processing apparatus according to claim 1,
    wherein the display control unit is configured to cause the display unit to display, the positions of the anomalous pixels to be corrected, together.

8. The information processing apparatus according to claim 1,
    wherein the display control unit is configured to cause the display unit to perform sequential display of the anomalous pixels corresponding to the plurality of image capture methods which have been selected so that the anomalous pixels are displayed on a method-by-method basis.

9. The information processing apparatus according to claim 1, further comprising
a threshold selecting unit is configured to select a threshold based on at least one of area sizes of groups of the anomalous pixels in the image, shapes that the groups form, and anomalous-pixel densities in predetermined regions of the image,
wherein the display control unit is configured to cause the display unit to display the anomalous pixels whose values are in a range that is determined based on the selected threshold.

10. The information processing apparatus according to claim 1, further comprising:
a pixel acquisition unit is configured to acquire the anomalous pixels that are obtained by performing a plurality of extraction schemes in which thresholds for extracting the anomalous pixels from images corresponding to predetermined image capture methods are different from one another; and
a selecting unit is configured to select extraction schemes for acquiring the anomalous pixels,
wherein the display control unit is configured to cause the display unit to display the anomalous pixels corresponding to the extraction schemes that have been selected in accordance with a selection of the selection unit.

11. The information processing apparatus according to claim 10,
wherein, in the extraction schemes, pixels that are determined as abnormal pixels in radiation images in which pixel values are equal to or higher than the thresholds among the images that have been captured based on the image capture methods are extracted as anomalous pixels.

12. The information processing apparatus according to claim 10,
wherein, in the extraction schemes, pixels having pixel values that are included in ranges which are determined based on the thresholds are extracted as the anomalous pixels from the images that have been captured based on the image capture methods.

13. The information processing apparatus according to claim 12,
wherein the ranges that are predetermined are ranges that are determined based on average values and dispersion of pixel values in predetermined regions of the images.

14. The information processing apparatus according to claim 1, further comprising:
a setting unit is configured to set an order in which a plurality of image capture methods are performed;
wherein the display control unit is configured to cause the display unit to display the acquired anomalous pixels in the order that has been set by the setting unit.

15. The information processing apparatus according to claim 14,
wherein the display control unit is configured to cause the display unit to display images showing positions of the anomalous pixels so that the images are arranged in the order that has been set by the setting unit.

16. The information processing apparatus according to claim 14,
wherein the display control unit is configured to cause the display unit to display images showing the positions of the anomalous pixels in a sequential manner so that switching among the images is performed.

17. The information processing apparatus according to claim 14,
wherein the setting unit is configured to set the order on the basis of an image capture protocol in which the plurality of image capture methods are used in combination.

18. An information processing apparatus that causes display of anomalous pixels to be corrected of a still image that has been obtained by an image capturing apparatus which captures a moving image and a still image, the information processing apparatus comprising:
an acquisition unit configured to acquire positions of anomalous pixels that appear in a still image that has been captured in a first image capture mode in which only a still image is captured, and to acquire positions of anomalous pixels to be corrected that appear in a still image that has been captured in a second image capture mode in which both a still image and a moving image are captured; and
a display control unit configured to cause display of position information indicating the positions of the acquired anomalous pixels to be corrected corresponding to the first imaging mode, and display of position information indicating the positions of the acquired anomalous pixels to be corrected corresponding to the second imaging mode, differently.

19. An information processing method comprising the steps:
acquiring positions of anomalous pixels in a captured radiation image corresponding to a plurality of image capture methods, each image capture method including an imaging condition for radiation imaging of a subject to be imaged and each image capture method corresponding to one predetermined acquisition scheme of an anomalous pixel; and
causing a display unit to display an image showing at least one of the anomalous pixels corresponding to one image capture method, and at least one of the anomalous pixels corresponding to multiple image capture methods, differently.

20. A non-transitory computer-readable storage medium storing a program that causes a computer to perform the information processing method according to claim 19.

21. An information processing system comprising:
an image capturing unit configured to capture a moving image and a still image;
an extracting unit configured to extract positions of anomalous pixels to be corrected that appear in a still image that has been captured in a first image capture mode in which only the still image is captured, and to extract positions of anomalous pixels to be corrected that appear in a still image that has been captured in a second image capture mode in which both the still image and a moving image are captured; and
a display control unit configured to cause display of position information of the extracted anomalous pixels to be corrected corresponding to the first imaging mode and, display of position information indicating the positions of the extracted anomalous pixels to be corrected corresponding to the second imaging mode, differently.

* * * * *